United States Patent
Kelly et al.

(10) Patent No.: US 7,139,870 B2
(45) Date of Patent: Nov. 21, 2006

(54) SYSTEM AND METHOD OF RUGGEDIZING DEVICES HAVING SPINNING MEDIA MEMORY, SUCH AS AUTOMATIC DATA COLLECTION DEVICES HAVING HARD DISK DRIVES

(75) Inventors: Stephen J. Kelly, Marion, IA (US); Michael Dant, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 402 days.

(21) Appl. No.: 10/608,243

(22) Filed: Jun. 27, 2003

(65) Prior Publication Data

US 2004/0268066 A1 Dec. 30, 2004

(51) Int. Cl.
G06F 12/00 (2006.01)
G06F 30/00 (2006.01)
G11B 15/18 (2006.01)

(52) U.S. Cl. .................. 711/112; 711/159; 711/103; 360/69

(58) Field of Classification Search .............. None
See application file for complete search history.

(56) References Cited

U.S. PATENT DOCUMENTS 5,835,298 A * 11/1998 Edgerton et al. ............. 360/75
6,212,026 B1 * 4/2001 Ohmi et al. .................. 360/60
6,332,203 B1 * 12/2001 Tanaka et al. ................ 714/42
6,570,726 B1 * 5/2003 Mutoh .......................... 360/60
6,748,485 B1 * 6/2004 Yokota et al. .............. 711/112
2003/0233501 A1 * 12/2003 Ma et al. ...................... 710/62
2004/0039871 A1 * 2/2004 Stobbs et al. ............... 711/103
2004/0059846 A1 * 3/2004 Liu et al. ...................... 710/62
2004/0078514 A1 * 4/2004 Kung et al. ................. 711/105

* cited by examiner

*Primary Examiner*—Stephen C. Elmore
*Assistant Examiner*—Michael C Krofcheck
(74) *Attorney, Agent, or Firm*—Seed IP Law Group PLLC

(57) ABSTRACT

A method of operating a device having at least one solid-state memory and at least one spinning media memory for storing data includes from time-to-time, determining whether the device is in motion; and in response to determining that the device is not in motion, transferring frequently accessed data between the spinning media memory and the solid-state memory. An apparatus for use with a device includes at least one solid-state memory; at least one spinning media memory; and a controller configured to transfer frequently accessed data between the spinning media memory and the solid-state memory when the device is not in motion.

24 Claims, 8 Drawing Sheets

SYSTEM AND METHOD OF RUGGEDIZING DEVICES HAVING SPINNING MEDIA MEMORY, SUCH AS AUTOMATIC DATA COLLECTION DEVICES HAVING HARD DISK DRIVES

BACKGROUND OF THE INVENTION

1. Field of the Invention

This invention relates generally to ruggedizing devices such as automatic data collection devices and/or computing devices, and in particular relates to ruggedizing devices having spinning media memory, for example hard disk drives.

2. Description of the Related Art

There are numerous applications requiring the storage and/or retrieval of large amounts of data. For example, retailing, warehousing and/or shipping may require the storage of large amounts of data such as for tracking sales, performing inventory and/or tracking location or status.

A large variety of devices exist for collecting, storing and/or retrieving data. For example, automatic data collection devices such as barcode readers or scanners, radio frequency identification (RFID) interrogators, and touch memory or optical memory readers. Also for example, computing devices such as personal computing systems, lap-top, handheld, palm-top or personal digital assistant (PDA) computing systems, point-of-sale (POS) terminals or cash registers, as well as numerous other devices.

The most cost effective data storage typically takes the form of rotating or spinning media memory, for example, hard disk drives, CD-ROM drives, magnetic disk drives such as floppy disk drives, and optical disk drives, to name a few. These memories typically employ read and/or write heads which are very closely spaced above the spinning media. Movement or shock may cause the heads to crash into the media resulting in damage to either the heads and/or the media. Thus, while capable of holding large amounts of data at low expense, spinning media memories are relatively delicate and not suitable for many environments, particularly where the spinning media memory will be subject to movement and/or shock. Some personal computing systems address this problem by allowing a user to temporarily disable or "park" the heads of the spinning media memory to prevent damage when the device containing the memory is to be moved.

A cost effective approach to providing access to large amounts of memory in challenging environments typically found in real-world applications is desirable.

BRIEF SUMMARY OF THE INVENTION

In one aspect, a method of operating a device having at least one solid-state memory and at least one spinning media memory for storing data includes: from time-to-time, determining whether the device is in motion; and in response to determining that the device is not in motion; and transferring data between the spinning media memory and the solid-state memory.

In another aspect, an apparatus for use with a device includes: at least one solid-state memory; at least one spinning media memory; and a controller configured to transfer data between the spinning media memory and the solid-state memory when the device is not in motion.

In yet another aspect, an apparatus for use with a device includes at least one solid-state memory; at least one spinning media memory; a controller configured to transfer data between the spinning media memory and the solid-state memory when the device is not in motion, and to not transfer data between the spinning media memory and the solid-state memory when the device is in motion; and a motion sensor coupled to provide at least one of velocity and acceleration information to the controller from which the controller can determine whether the device is in motion.

In yet another aspect, an apparatus for use with a device includes at least one solid-state memory; at least one spinning media memory; and a controller configured to transfer data between the spinning media memory and the solid-state memory when the device is not in motion, and to not transfer data between the spinning media memory and the solid-state memory when the device is in motion; wherein the device is a vehicle and the apparatus is incorporated into a general-purpose computing system carried by the vehicle.

In yet another aspect, an apparatus for use with a device includes at least one solid-state memory; at least one spinning media memory; and a controller configured to transfer data between the spinning media memory and the solid-state memory when the device is not in motion, and to not transfer data between the spinning media memory and the solid-state memory when the device is in motion; wherein the device is a user carried automatic data collection unit and the apparatus is incorporated into the user carried automatic data collection unit.

In yet another aspect, an apparatus for use with a device includes at least one solid-state memory; at least one spinning media memory; and a controller configured to transfer data between the spinning media memory and the solid-state memory when the device is not in motion, and to not transfer data between the spinning media memory and the solid-state memory when the device is in motion; wherein the device is user carried general purpose computing system and the apparatus is incorporated into the user carried general purpose computing system.

BRIEF DESCRIPTION OF THE SEVERAL VIEWS OF THE DRAWINGS

In the drawings, identical reference numbers identify similar elements or acts. The size and relative positions of elements in the drawings are not necessarily drawn to scale. For example, the shapes of various elements are not drawn to scale, and some of these elements are arbitrarily enlarged and/or positioned to improve drawing legibility. Further, the particular shapes of the elements, as drawn are not intended to convey any information regarding the actual shape of the particular elements, and have been solely selected for their ease in recognition of the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with computing systems, automatic data collection devices such as barcode readers, radio frequency identification (RFID) interrogators, touch memory readers, optical memory readers, spinning media memories such as hard disk drives, optical drives, magnetic disk drives, and/or floppy disk drives, solid-state memories such as random access memories (RAM), EPROMs, and EEPROMs, have not been described in detail to avoid unnecessarily obscuring the descriptions of the embodiments in the invention.

Unless the context requires otherwise, throughout the specification and claims which follow, the word "comprise" and variations thereof, such as "comprises" and "comprising" are to be construed in an open sense, that is as "including, but not limited to."

Figure 1:
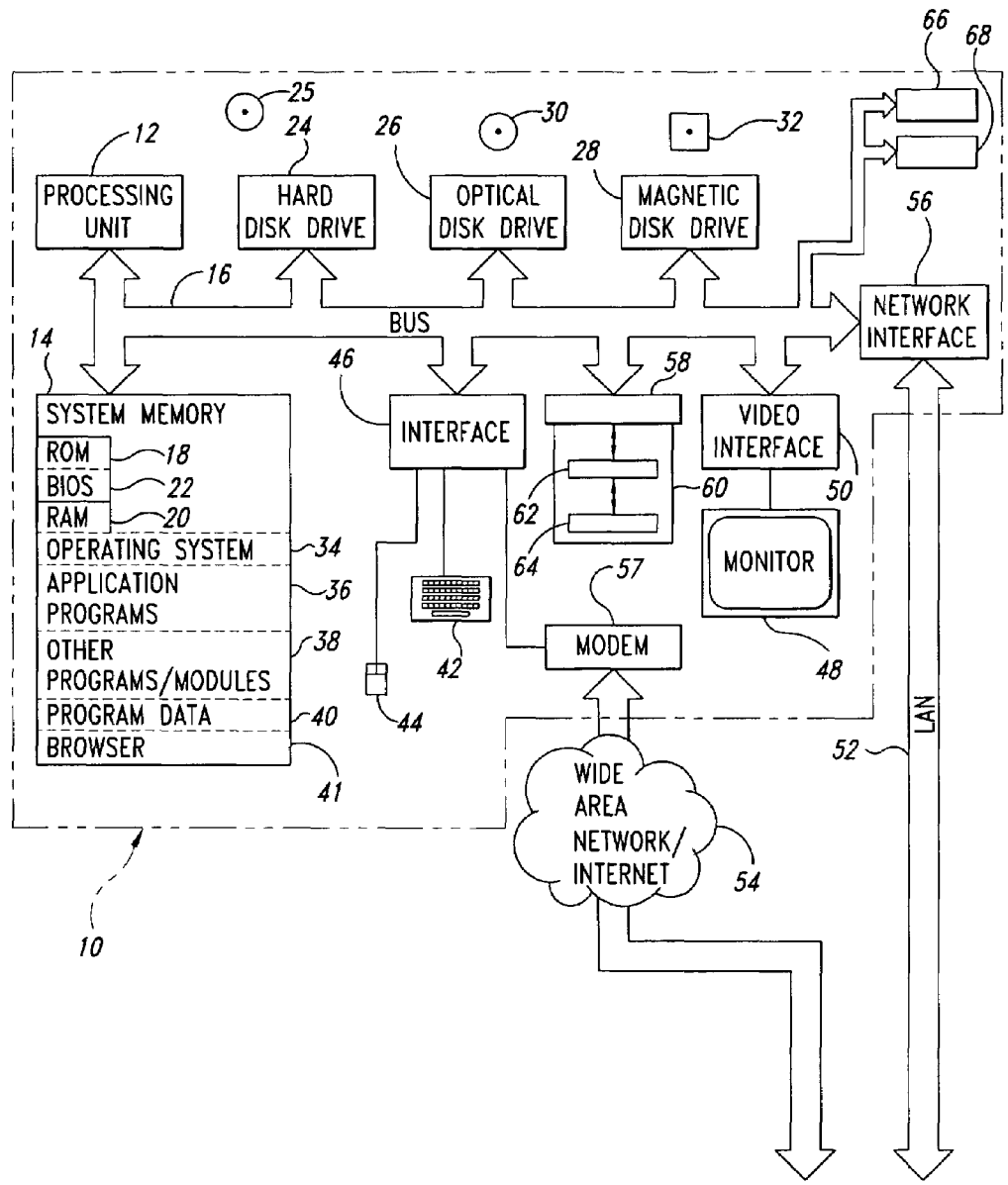
FIG. 1 is a schematic diagram of a ruggedizing computing system including a controller and a solid-state memory according to a first illustrated embodiment of the invention.

FIG. 1 and the following discussion provide a brief, general description of a suitable computing environment in which the invention may be implemented. Although not required, embodiments in the invention will be described in the general context of computer-executable instructions, such as program application modules, objects, or macros being executed by a personal computer. Those skilled in the relevant art will appreciate that the invention can be practiced with other computing system configurations, including handheld devices, multiprocessor systems, microprocessor-based or programmable consumer electronics, network PCs, minicomputers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 1, a conventional personal computer referred to herein as a computing system 10 includes a processor unit 12, a system memory 14 and a system bus 16 that couples various system components including the system memory 14 to the processing unit 12. The processing unit 12 may be any logical processing unit, such as one or more central processing units (CPUs), digital signal processors (DSPs), application-specific integrated circuits (ASIC), etc. Unless described otherwise, the construction and operation of the various blocks shown in FIG. 1 are of conventional design. As a result, such blocks need not be described in further detail herein, as they will be understood by those skilled in the relevant art.

The system bus 16 can employ any known bus structures or architectures, including a memory bus with memory controller, a peripheral bus, and/or a local bus. The system memory 14 includes read-only memory ("ROM") 18 and random access memory ("RAM") 20. A basic input/output system ("BIOS") 22, which can form part of the ROM 18, contains basic routines that help transfer information between elements within the computing system 10, such as during startup.

The computing system 10 also includes one or more spinning media memories such as a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 12 via the bus 16. The hard disk drive 24, optical disk drive 26 and magnetic disk drive 28 may include interfaces or controllers coupled between such drives and the bus 16, as is known by those skilled in the relevant art, for example via an IDE (i.e., Integrated Drive Electronics) interface. The drives 24, 26 and 28, and their associated computer-readable media, provide nonvolatile storage of computer-readable instructions, data structures, program modules and other data for the computing system 10. Although the depicted computing system 10 employs hard disk 25, optical disk 30 and magnetic disk 32, those skilled in the relevant art will appreciate that other types of spinning media memory computer-readable media may be employed, such as, digital video disks ("DVD"), Bernoulli cartridges, etc. Those skilled in the relevant art will also appreciate that other types of computer-readable media that can store data accessible by a computer may be employed, for example, non-spinning media memories such as magnetic cassettes, flash memory cards, RAMs, ROMs, smart cards, etc.

Program modules can be stored in the system memory 14, such as an operating system 34, one or more application programs 36, other programs or modules 38, and program data 40. The system memory 14 also includes a browser 41 for permitting the computing system 10 to access and exchange data with sources such as websites of the Internet, corporate intranets, or other networks, as well as other server applications on server computers. The browser 41 is markup language based, such as hypertext markup language ("HTML"), and operate with markup languages that use syntactically delimited characters added to the data of a document to represent the structure of the document.

While shown in FIG. 1 as being stored in the system memory, the operating system 34, application programs 36, other program modules 38, program data 40 and browser 41 can be stored on the hard disk 25 of the hard disk drive 24, the optical disk 30 and the optical disk drive 26 and/or the magnetic disk 32 of the magnetic disk drive 28. A user can enter commands and information to the computing system 10 through input devices such as a keyboard 42 and a pointing device such as a mouse 44. Other input devices can include a microphone, joystick, game pad, scanner, etc. These and other input devices are connected to the processing unit 12 through an interface 46 such as a serial port interface that couples to the bus 16, although other interfaces such as a parallel port, a game port or a universal serial bus ("USB") can be used. A monitor 48 or other display devices may be coupled to the bus 16 via video interface 50, such as a video adapter. The computing system 10 can include other output devices such as speakers, printers, etc.

The computing system 10 can operate in a networked environment using logical connections to one or more remote computers. The computing system 10 may employ any known means of communications, such as through a local area network ("LAN") 52 or a wide area network ("WAN") or the Internet 54. Such networking environments are well known in enterprise-wide computer networks, intranets, and the Internet.

When used in a LAN networking environment, the computing system 10 is connected to the LAN 52 through an adapter or network interface 56 (communicatively linked to the bus 16). When used in a WAN networking environment, the computing system 10 often includes a modem 57 or other device for establishing communications over the WAN/Internet 54. The modem 57 is shown in FIG. 1 as communicatively linked between the interface 46 and the WAN/Internet 54. In a networked environment, program modules, application programs, or data, or portions thereof, can be stored in a server computer (not shown). Those skilled in the relevant art will readily recognize that the network connections shown in FIG. 1 are only some examples of establishing communication links between computers, and other links may be used, including wireless links.

The computing system 10 may include one or more interfaces such as slot 58 to allow the addition of devices either internally or externally to the computing system 10. For example, suitable interfaces may include ISA (i.e., Industry Standard Architecture), IDE, PCI (i.e., Personal Computer Interface) and/or AGP (i.e., Advance Graphics Processor) slot connectors for option cards, serial and/or parallel ports, USB ports (i.e., Universal Serial Bus), audio input/output (i.e., I/O) and MIDI/joystick connectors, and/or slots for memory.

In the particular embodiment illustrated in FIG. 1, a caching card 60 is coupled to the bus 16 via the interface 58. The cache card 60 includes a controller such as a microcontroller or microprocessor 62 and a solid-state memory 64 such as RAM or EEPROM (i.e., Electronically Erasable Programmable Read-Only Memory). In at least one embodiment, the cache card 60 connects between the interface 58 and an interface (not shown) of the spinning media memory, for example, an IDE interface. The controller 62 and solid-state memory 64 allows the caching of frequently used data to reduce or completely eliminate the need to access the spinning media memory 24, 26, 28, as discussed more fully below. For example, the card 60 may cache frequently used data from one or more of the spinning media memories 24, 26, 28 for use when the computing system 10 is in motion or at risk of shock.

The computing system 10 may also include motion sensors, for example, a velocity sensor 66 and/or an acceleration sensor 68 for providing motion information to the caching card 60, for example, via the bus 16. The controller 62 on the caching card 60 can use the motion information to determine when the computing system 10 is in motion to control the caching of information in the solid-state memory 64 and/or to enable/disable one or more of the spinning media memories 24, 26, 28, as discussed more fully below.

Figure 2:
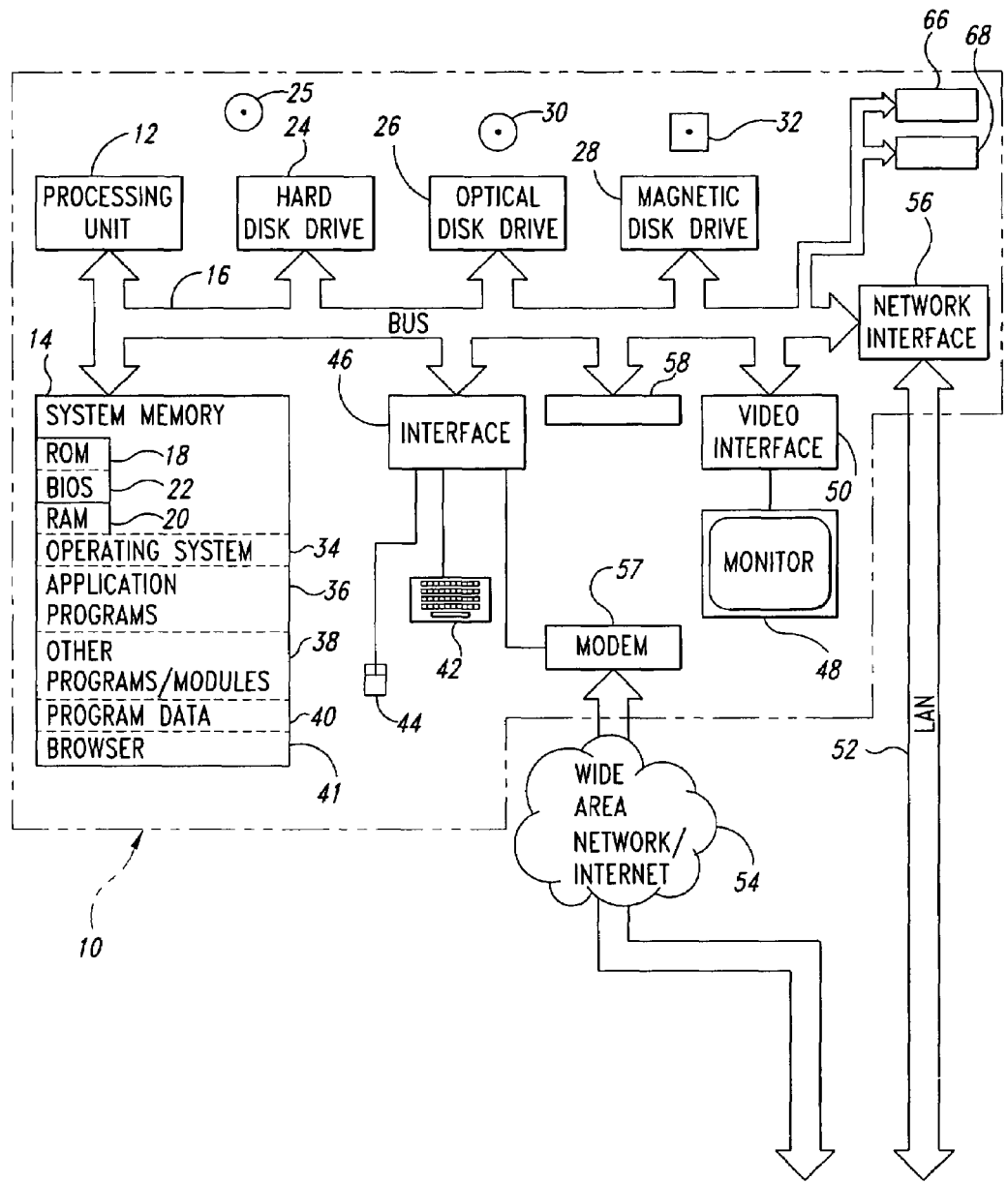
FIG. 2 is a schematic diagram of a ruggedized computing system according to a second illustrated embodiment of the invention.

FIG. 2 shows an automatic data collection device 10, which in many respects is similar in construction to the computing devices 10 of the FIG. 1, thus only significant differences will be discussed. In the embodiment of FIG. 2, the caching functions are implemented by the processing unit 12 executing instructions stored in the system memory 14. Thus, the processing unit 12 serves as the controller 62 (FIG. 1) and the system memory 14 serves as the solid-state memory 64 (FIG. 1). The caching function acts as a spinning media drive filter driver with respect to the system memory 14 and an interface to the spinning media memory 24, 26, 28, such as an IDE interface. Other aspects of the embodiment of FIG. 2 are similar to that of FIG. 1, so will not be discussed in the interest of brevity.

Figure 3:
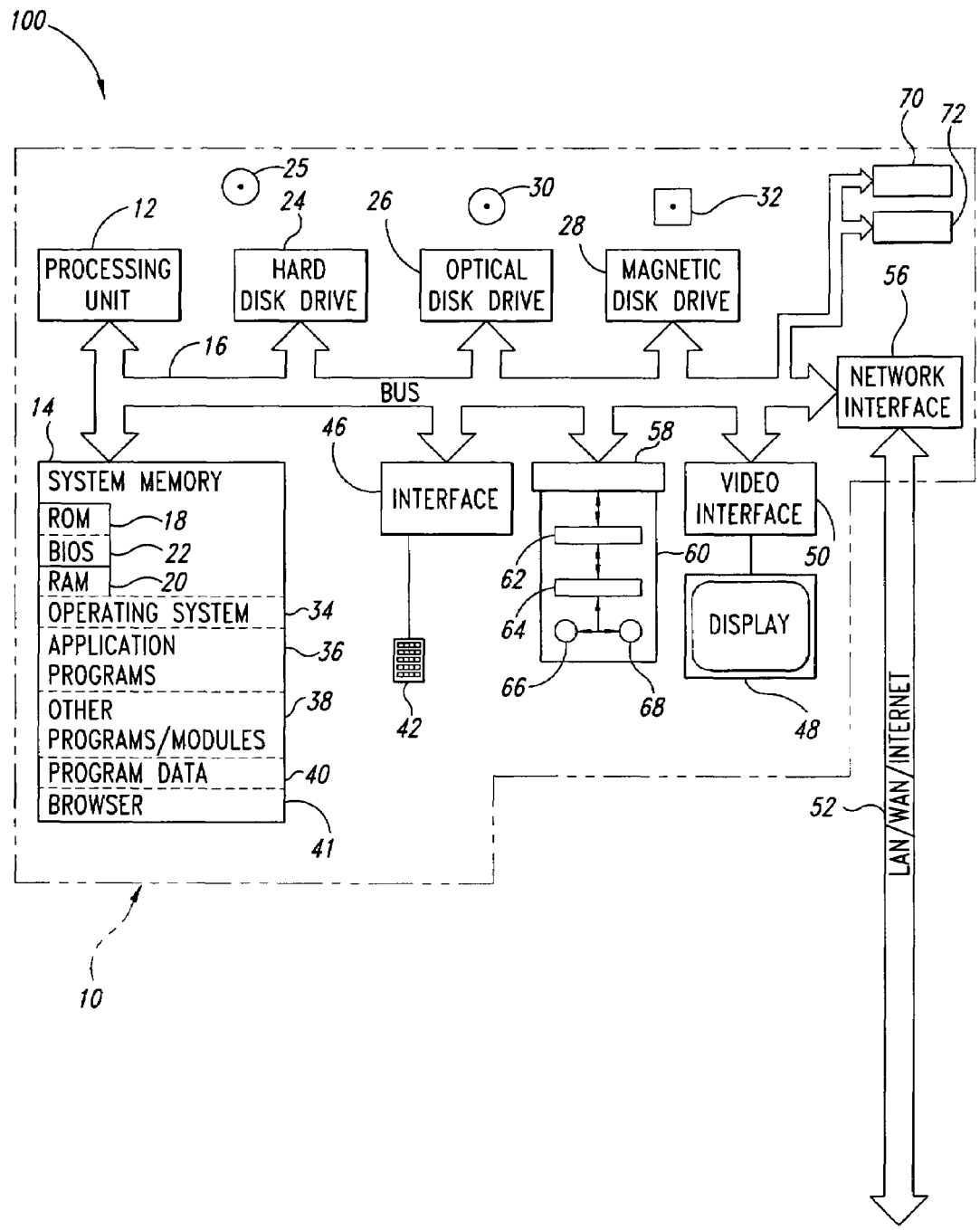
FIG. 3 is a schematic diagram of a ruggidized automatic data collection device including a controller and a solid-state memory according to a third illustrated embodiment of the invention.

FIG. 3 shows an automatic data collection device 10, which in many respects is similar in construction to the computing devices 10 of the FIGS. 1 and 2, thus only significant differences will be discussed. The automatic data collection device 10 includes components for automatically reading information that is carried by objects. For example, the automatic data collection device 10 may include a reader 70 for reading information from an external information carrier and/or a decoder 72 for decoding the read information. The reader 70 may take the form of a machine-readable symbol imager or scanner, an RFID interrogator (i.e., transceiver and antenna), a touch memory electrical transceiver, or an optical memory optical transceiver. The decoder 72 may take the form of a machine-readable symbol decoder such as a barcode symbol decoder or a decoder for decoding information stored in RFID tags, touch memories and/or optical memories.

As illustrated in FIG. 3, motion sensors, such as the velocity sensor 66 and/or acceleration sensor 68, may be mounted on the cache card 60. The embodiment of FIG. 1 could employ a similar approach to mounting the sensors.

Figure 4:
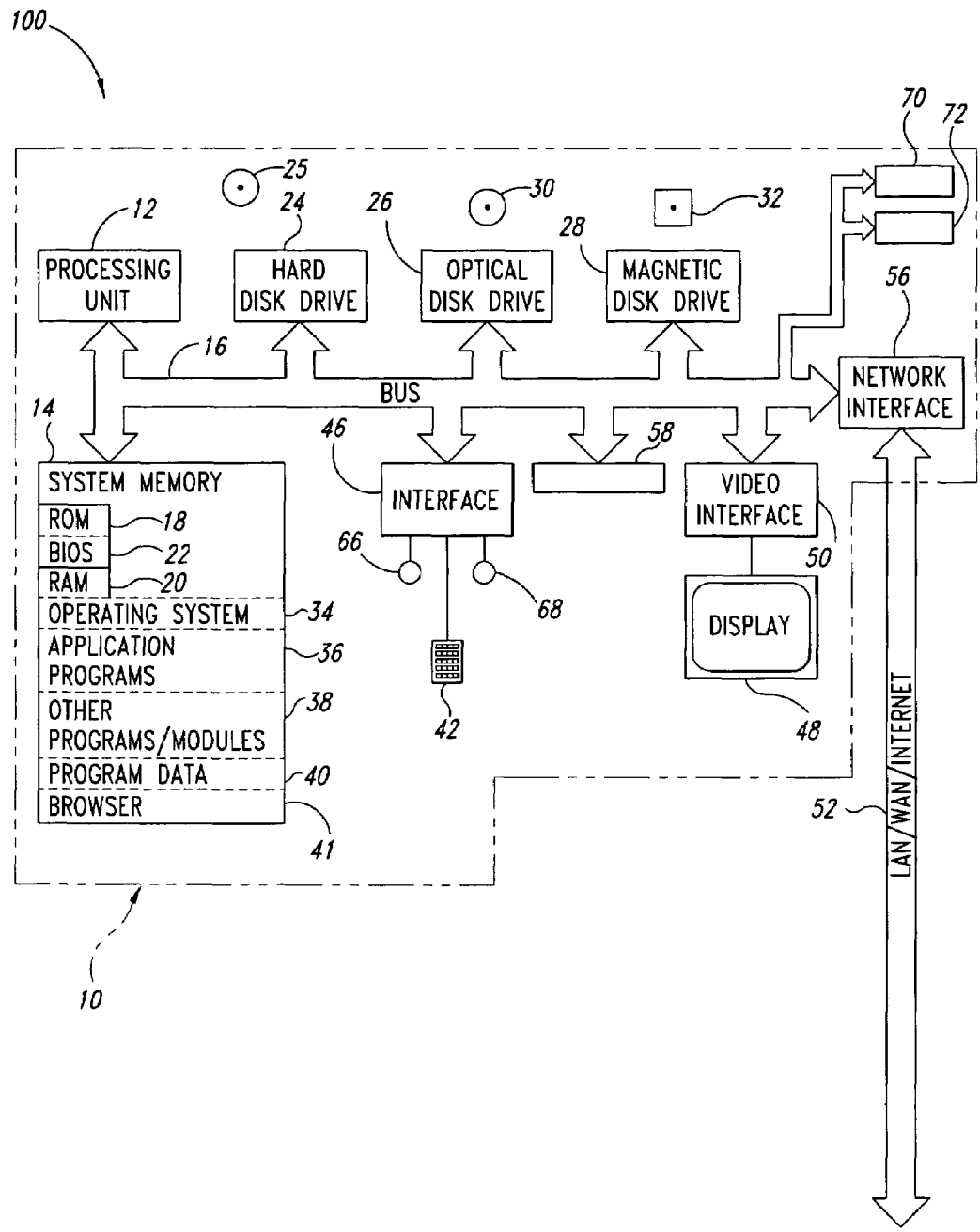
FIG. 4 is a schematic diagram of a ruggedized automatic data collection device according to a fourth illustrated embodiment of the invention.

FIG. 4 shows an automatic data collection device 10 including a reader 70 and decoder 72, similar to those discussed in reference to FIG. 3, and employing the processing unit 12 and system memory 14 to cache data in a similar fashion to that discussed in reference to FIG. 2.

As illustrated in the embodiment of FIG. 4, the motion sensor, such as the velocity sensor 66 and/or acceleration sensor 68, may be external to the computing system 10 and coupled to the bus 16, for example, via the interface 46 or some other interface. Thus, for example, the motion sensors 66, 68 may be carried or mounted to the computing system or automatic data collection device 10, or even to a vehicle 76 (FIG. 7) carrying the computing system or automatic data collection device 10 for detecting motion of the vehicle. The embodiment of FIGS. 1, 2 or 3 may employ a similar approach to the sensor mounting.

Where the motion sensors are mounted to the vehicle, a large variety of alternative motion sensors may be employed, in addition to, or as a substitute for, the velocity and/or acceleration sensors 66, 68. For example, the motion sensor may take the form of a proximity sensor, detecting changes in distance of the vehicle to an object. Also for example, the velocity and/or acceleration sensors 66, 68 may detect the rotation of a drive component of the vehicle such as a drive shaft or wheel, or may detect the position of an accelerator pedal. Otherwise, the motion sensors can take for form of any speedometer, velocitometer or accelerometer, including but not limited to a Reed switch and/or optical encoder and toothed wheel.

Figure 5:
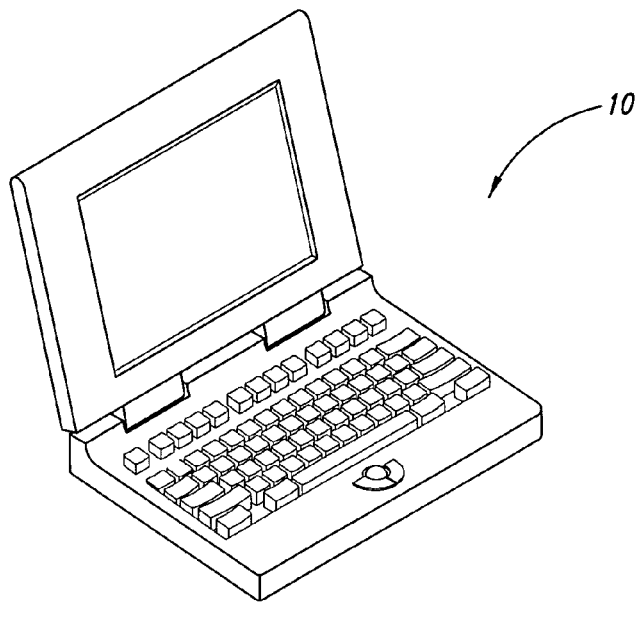
FIG. 5 is an isometric view of a ruggidized computing device according to the embodiments of FIGS. 1 and 2.
Figure 7:
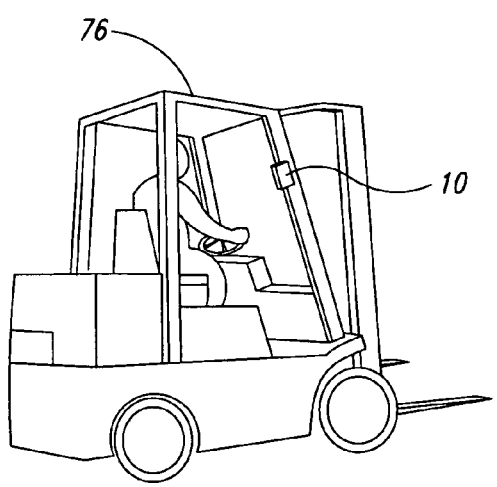
FIG. 7 is an isometric view of a vehicle carrying a ruggidized computing device and/or automatic data collection device.

FIG. 5 shows an example of a computing system 10 in the form of a laptop or notebook computer suitable to be carried by a user and/or a vehicle 76 (FIG. 7).

Figure 6:
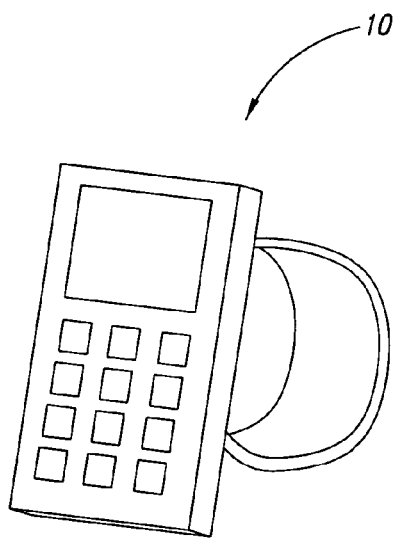
FIG. 6 is an isometric view of a ruggidized automatic data collection device according to the embodiments of FIGS. 3 and 4.

FIG. 6 shows an example of an automatic data collection device 10 in the form of a hand held automatic data collection device suitable to be carried by a user and/or a vehicle 76 (FIG. 7).

FIG. 7 shows a vehicle 76, for example a forklift, carrying the computing system and/or automatic data collection device 10.

Figure 8A:
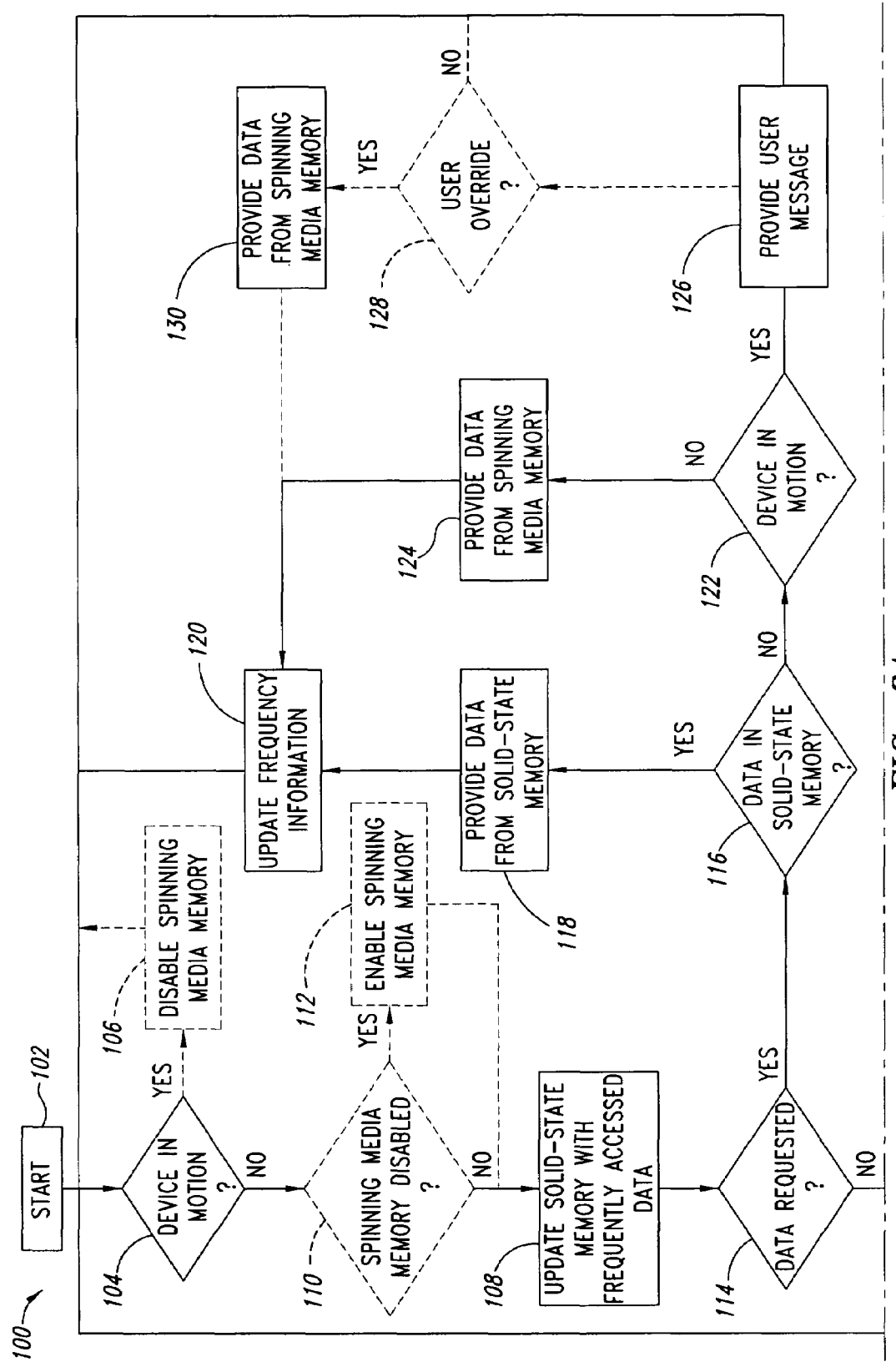
FIGS. 8A and 8B are a flow diagram showing an illustrated method according to one embodiment of the invention.
Figure 8B:
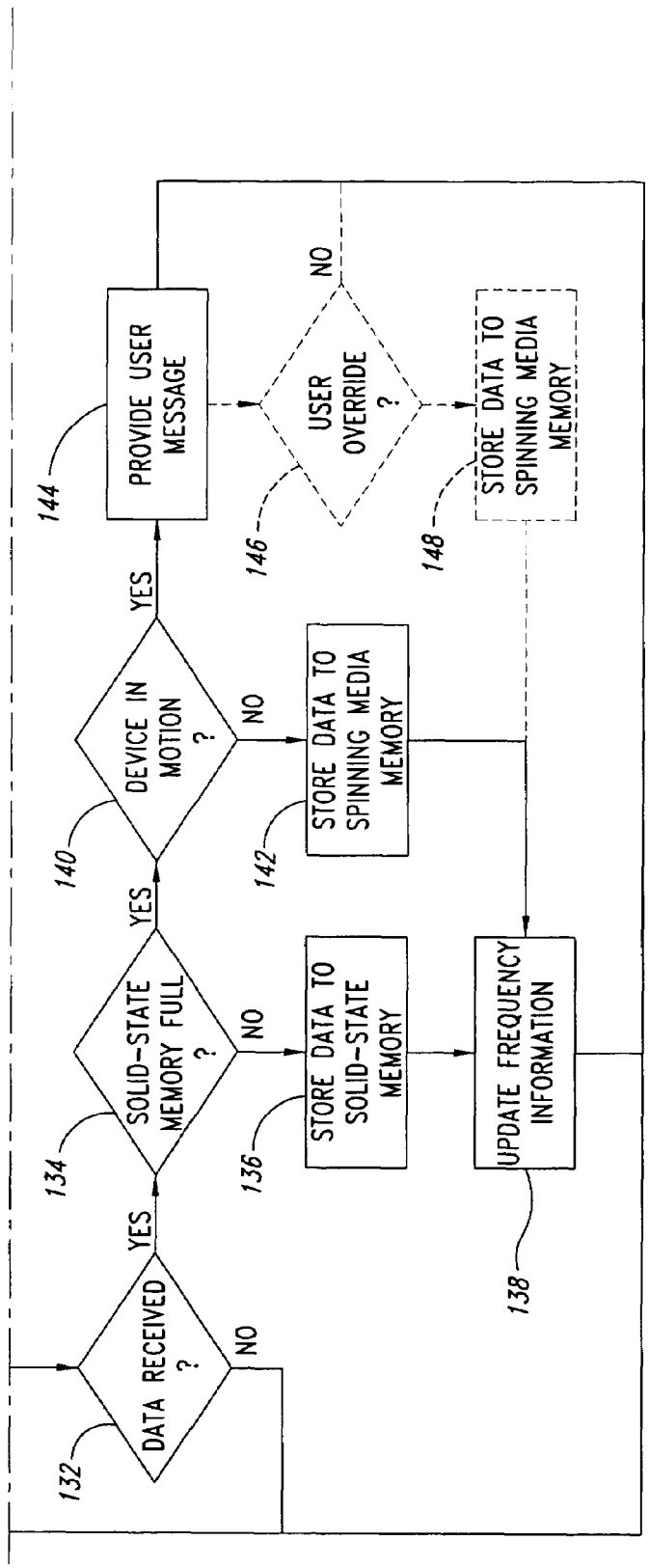

FIGS. 8A and 8B show a method 100 of operating any of the devices 10 of FIGS. 1–4 starting in act 102. References in the description to the controller are to the controller 62 with respect to operation of the embodiments of FIGS. 1 and 3, and the controller 12 with respect to operation of the embodiments of FIGS. 2 and 4. References in the description to the solid-state memory are to the solid-state memory 64 with respect to operation of the embodiments of FIGS. 1 and 3, and the system memory 14 with respect to operation of the embodiments of FIGS. 2 and 4. References in the description to the device are to the computing system 10 with respect to operation of the embodiments of FIGS. 1 and 2, and to the automatic collection device with respect to operation of the embodiments of FIGS. 3 and 4. While some optional acts are illustrated in broken line, other acts may be optional.

In act 104, the controller 62, 12 determines whether the device 10 is in motion. The controller 62, 12 may rely on information from the motion sensors, such as velocity sensor 66 and/or acceleration sensor 68. If the controller 62, 12 determines that the device 10 is in motion, the controller 62, 12 executes a wait loop, returning to the input of act 104. In optional act 106, the controller 62, 12 may disable the spinning media memory before returning to the input of act 104. If the controller 62, 12 determines that the device 10 is not in motion, in act 108 the controller 62, 12 updates the solid-state memory 64, 14 with frequently accessed data. In optional act 110, the controller 62, 12 may determine whether the spinning media memory 24, 26, 28 has been disabled, enabling the spinning media memory 24, 26, 28 in act 112, if required, before executing act 108.

In act 114, the controller 62, 12 determines whether data was requested. If data was requested, the controller 62, 12 then determines in act 116 whether the requested data is available in the solid-state memory 64, 14. If the data is available in the solid-state memory 64, 14, the controller 62, 12 provides the data from the solid-state memory 64, 14 in act 118. In act 120, the controller 62, 12 may then update the frequency information which may take the form of a table or other data structure, and returning to the input of act 104.

If the requested data is not available in the solid-state memory 64, 14, in act 122 the controller 62, 12 determines whether the device 10 is in motion. If the device 10 is not in motion, the controller 62, 12 provides the data from the spinning media memory 24, 26, 28 in act 124, updating the frequency information in act 120 and returning to the input of act 104. If the device 10 is in motion, the controller 62, 12 provides a user message in act 126. For example, the user message may indicate that the vehicle 76 must be stopped to access the data or that the data is not available until the vehicle 76 is stopped. Optionally, the user message may indicate that the data should not be accessed until the vehicle 76 is stopped but may allow the user to elect to access the data while the vehicle 76 is in motion, the user accepting the risk of damage to the spinning media memory 24, 26, 28. Thus, in optional act 128 the controller 62, 12 determines whether a user override input has been received. If no user override input has been received, control passes to the input of act 104. If a user override has been received, the controller 62, 12 provides the data from the spinning media memory in act 130, updating the frequency information in act 120 and returning to the input of act 104.

If the controller 62, 12 determines that data has not been requested in act 114, in act 132 the controller 62, 12 determines whether data has been received. If data has not been received, control returns to the input of act 104. If data has been received, in act 134 the controller 62, 12 determines if the solid-state memory 64, 14 is full. If the solid-state memory is not full, in act 136 the controller 62, 12 stores the data to the solid-state memory 64, 14 and updates the frequency information in act 138, then returning to the input of act 104. If the solid-state memory is full, in act 140 the controller 62, 12 determines whether the device 10 is in motion. If the device 10 is not in motion, in act 142 the controller 62, 12 stores the data to the spinning media memory 24, 26, 28, updating frequency information in act 138 and returning control to the input of act 104.

If the controller 62, 12 determines that the device 10 is in motion, the controller 62, 12 provides a user message in act 144. For example, the user message may indicate that the vehicle 76 must be stopped before storing the information. Optionally, the user message may indicate that the vehicle 76 should be stopped before storing the information, but allowing the user to elect to store the information at the risk of damaging the spinning media memory 24, 26, 28. Thus, in optional act 146 the controller 62, 12 determines whether a user override input has been received. If no user override input has been received, control is returned to the input of act 104. If the controller 62, 12 determines that a user override input has been received, in optional act 148 the controller 62, 12 stores the data to the spinning media memory 24, 26, 28, updating the frequency information in act 138, and then returning control to the input of act 104.

Figure 9:
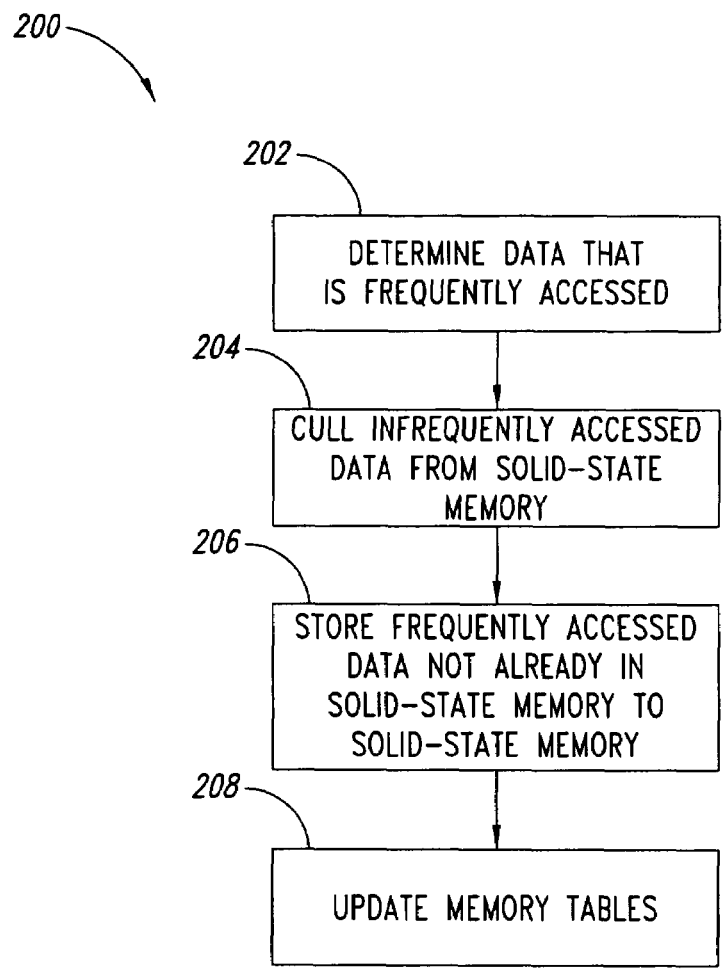
FIG. 9 is a flow diagram showing a method of performing one of the acts of the method of FIGS. 8A and 8B.

FIG. 9 shows a method of updating the solid-state memory 64 with frequently accessed data as per act 108 of method 100 (FIGS. 8A and 8B). In act 202, the controller 62, 12 determines data that is frequently accessed. The controller 62, 12 may employ a data structure to keep an account of the number of times a piece of data or section of memory has been addressed either with a read or a write request. The controller 62, 12 may employ a weighted algorithm based on how recently the access occurred. For example, the piece of data may receive a higher rating of each access within some set period, and/or a lower rating for each access before some set period. The controller 62, 12 may employ different weightings for read requests versus write requests, or may ignore either read requests or write requests.

In act 204, the controller 62, 12 culls infrequently accessed data from the solid-state memory 64, 14, making room for additional data. Culling may simply require the updating of directory tables for the solid-state memory 64, 14, or may include the actual writing over of the data in the solid-state memory 64, 14. In act 206, the controller 62, 12 stores frequently accessed data not already in the solid-state memory 64, 14 to the solid-state memory 64. Optionally, the controller 62, 12 may store all frequently accessed data. Storing all frequently accessed data may simplify the process, while storing only data not already stored may enhance the speed of the process. In act 208, the controller 62, 12 updates memory tables for the solid-state memory 64, 14.

Although specific embodiments of and examples for the computing system and automatic data collection device are described herein for illustrative purposes, various equivalent modifications can be made without departing from the spirit and scope of the invention, as will be recognized by those skilled in the relevant art. The teachings provided herein of the invention can be applied to other microprocessor controlled devices having spinning media memories, not necessarily the exemplary computing system and/or automatic data collection device generally described above. The various embodiments described above can be combined to provide further embodiments.

These and other changes can be made to the invention in light of the above detailed description. In general, in the following claims, the terms used should not be construed to limit the invention to the specific embodiments disclosed in the specification and the claims, but should be construed to include all computing devices and/or data collection devices that operate in accordance with the claims. Accordingly, the invention is not limited by the disclosure, but instead its scope is to be determined entirely by the following claims.

The invention claimed is:

1. A method of operating a device having at least one solid-state memory and at least one spinning media memory for storing data, the method comprising:
   from time-to-time, determining whether the device is in motion; and
   in response to determining that the device is not in motion, transferring data between the spinning media memory and the solid-state memory.

2. The method of claim 1 wherein transferring data between the spinning media memory and the solid-state memory occurs only when the device is determined not to be in motion.

3. The method of claim 1 wherein transferring data between the spinning media memory and the solid-state memory includes writing data from the spinning media memory to the solid-state memory.

4. The method of claim 1 wherein transferring data between the spinning media memory and the solid-state memory includes writing data from the solid-state memory to the spinning media memory.

5. The method of claim 1 wherein transferring data between the spinning media memory and the solid-state memory includes:
   removing data from the solid-state memory; and
   copying data from the spinning media memory to the solid-state memory.

6. The method of claim 1 wherein transferring data between the spinning media memory and the solid-state memory includes:
   removing data from the solid-state memory; and
   copying data from the spinning media memory to the solid-state memory, if the data is not already in the solid-state memory.

7. The method of claim 1, further comprising:
   tracking frequency access information for the data.

8. The method of claim 1, further comprising:
   sensing at least one of a velocity and an acceleration of the device, and wherein determining whether the device is in motion is based at least in part on one of the sensed velocity and acceleration.

9. The method of claim 1, further comprising:
   receiving a request for data;
   determining whether the requested data is in the solid-state memory; and
   in response to determining that the requested data is in the solid-state memory, providing the requested data from the solid-state memory.

10. The method of claim 1, further comprising:
    receiving a request for data;
    determining whether the requested data is in the solid-state memory;
    in response to determining that the requested data is not in the solid-state memory,
    determining whether the device is in motion; and
    in response to determining that the requested data is not in solid-state memory and that the device is not in motion, providing the requested data from the spinning media memory.

11. The method of claim 1, further comprising:
    receiving a request for data;
    determining whether the requested data is in the solid-state memory;
    in response to determining that the requested data is not in the solid-state memory,
    determining whether the device is in motion;
    in response to determining that the requested data is not in solid-state memory and that the device is not in motion, providing the requested data from the spinning media memory; and
    updating frequency access information.

12. The method of claim 1, further comprising:
    receiving a request for data;
    determining whether the requested data is in the solid-state memory;
    in response to determining that the requested data is not in the solid-state memory,
    determining whether the device is in motion; and
    in response to determining that the requested data is not in solid-state memory and that the device is in motion, producing a user notification that the requested data is not available while the device is in motion.

13. The method of claim 1, further comprising:
    receiving a request for data;
    determining whether the requested data is in the solid-state memory;
    in response to determining that the requested data is not in the solid-state memory,
    determining whether the device is in motion; and
    in response to determining that the requested data is not in solid-state memory and that the device is in motion, producing a user notification that the requested data should not be accessed while the device is in motion.

14. The method of claim 1, further comprising:
    receiving a request for data;
    determining whether the requested data is in the solid-state memory;
    in response to determining that the requested data is not in the solid-state memory,
    determining whether the device is in motion;
    in response to determining that the requested data is not in solid-state memory and that the device is in motion, producing a user notification that the device should be stopped before retrieving the requested data;
    receiving a user override input; and
    in response to the received user override input, retrieving the requested data from the spinning media memory.

15. The method of claim 1, further comprising:
    receiving a request for data;
    determining whether the requested data is in the solid-state memory;
    in response to determining that the requested data is not in the solid-state memory,
    determining whether the device is in motion;
    in response to determining that the requested data is not in solid-state memory and that the device is in motion, producing a user notification that the device should be stopped before retrieving the requested data;
    receiving a user override input;
    in response to the received user override input, copying the requested data from the spinning media memory to the solid-state memory; and
    providing the requested data from the solid-state memory.

16. The method of claim 1, further comprising:
    receiving data to store;
    storing the data to the solid-state memory;
    determining whether the device is in motion;
    waiting until the device is determined not to be in motion; and storing the data to the spinning media memory when the device is determined not to be in motion.

17. The method of claim 1, further comprising:
receiving data to store;
determining whether the solid-state memory is full;
in response to determining that the solid-state memory is full, determining whether the device is in motion; and
in response to determining that the device is not in motion, storing the data to the spinning media memory.

18. The method of claim 1, further comprising:
receiving data to store;
determining whether the solid-state memory is full;
in response to determining that the solid-state memory is full, determining whether the device is in motion; and
in response to determining that the device is in motion, providing a user message that the device must be stopped to store the data.

19. The method of claim 1, further comprising:
receiving data to store;
determining whether the solid-state memory is full;
in response to determining that the solid-state memory is full, determining whether the device is in motion;
in response to determining that the device is in motion, providing a user message that the device should be stopped to store the data;
receiving a user override input; and
in response to receiving the user override input, storing the data to the spinning media memory.

20. The method of claim 1, further comprising:
disabling the spinning media memory while the device is determined to be in motion.

21. An apparatus for use with a device, the apparatus comprising:
at least one solid-state memory;
at least one spinning media memory;
a controller configured to transfer data between the spinning media memory and the solid-state memory when the device is not in motion, and to not transfer data between the spinning media memory and the solid-state memory when the device is in motion; and
a motion sensor coupled to provide at least one of velocity and acceleration information to the controller from which the controller can determine whether the device is in motion.

22. An apparatus for use with a device, the apparatus comprising:
at least one solid-state memory;
at least one spinning media memory; and
a controller configured to transfer data between the spinning media memory and the solid-state memory when the device is not in motion, and to not transfer data between the spinning media memory and the solid-state memory when the device is in motion; wherein the device is a vehicle and the apparatus is incorporated into a general-purpose computing system carried by the vehicle.

23. An apparatus for use with a device, the apparatus comprising:
at least one solid-state memory;
at least one spinning media memory; and
a controller configured to transfer data between the spinning media memory and the solid-state memory when the device is not in motion, and to not transfer data between the spinning media memory and the solid-state memory when the device is in motion; wherein the device is a user earned automatic data collection unit and the apparatus is incorporated into the user carried automatic data collection unit.

24. An apparatus for use with a device, the apparatus comprising:
at least one solid-state memory;
at least one spinning media memory; and
a controller configured to transfer data between the spinning media memory and the solid-state memory when the device is not in motion, and to not transfer data between the spinning media memory and the solid-state memory when the device is in motion; wherein the device is a user carried general purpose computing system and the apparatus is incorporated into the user carried general purpose computing system.

* * * * *